(12) United States Patent
Bhide et al.

(10) Patent No.: US 9,049,218 B2
(45) Date of Patent: Jun. 2, 2015

(54) STATELESS FIBRE CHANNEL SEQUENCE ACCELERATION FOR FIBRE CHANNEL TRAFFIC OVER ETHERNET

(71) Applicant: Emulex Corporation, Costa Mesa, CA (US)

(72) Inventors: Parag Dattatraya Bhide, Costa Mesa, CA (US); Glenn Chih Yu, Costa Mesa, CA (US); Rahul Korivi Subramaniyam, Sunnyvale, CA (US)

(73) Assignee: EMULEX CORPORATION, Costa, Mesa, CA (US)

( * ) Notice: Subject to any disclaimer, the term of this patent is extended or adjusted under 35 U.S.C. 154(b) by 0 days.

(21) Appl. No.: 14/547,278

(22) Filed: Nov. 19, 2014

(65) Prior Publication Data

US 2015/0085661 A1    Mar. 26, 2015

Related U.S. Application Data

(63) Continuation of application No. 12/337,467, filed on Dec. 17, 2008, now Pat. No. 8,923,322.

(51) Int. Cl.
*H04L 29/08* (2006.01)
*H04L 29/06* (2006.01)

(52) U.S. Cl.
CPC ............ *H04L 67/1097* (2013.01); *H04L 69/12* (2013.01); *H04L 69/32* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 6,425,034 B1 * | 7/2002 | Steinmetz et al. | 710/305 |
| 7,991,748 B2 * | 8/2011 | Rowan et al. | 707/677 |
| 2003/0210686 A1 * | 11/2003 | Terrell et al. | 370/389 |
| 2005/0157752 A1 * | 7/2005 | Takase et al. | 370/468 |
| 2007/0067497 A1 * | 3/2007 | Craft et al. | 709/250 |
| 2008/0159260 A1 * | 7/2008 | Vobbilisetty et al. | 370/351 |

* cited by examiner

*Primary Examiner* — Joseph Bednash
(74) *Attorney, Agent, or Firm* — McAndrews, Held & Malloy Ltd.

(57) ABSTRACT

A method for offloading Fiber Channel transmit data in an I/O operation. The transmit data includes Fiber Channel sequences, each Fiber Channel sequence includes multiple frames. The method includes generating a single transmit sequence request descriptor for transmitting all of the plurality of frames; creating an Ethernet header, a FCoE encapsulation header, and a Fiber Channel header for each frame in response to information in the transmit sequence request descriptor; creating start of frame and end of frame delimiters; inserting data into each frame; computing Fiber Channel CRC and Ethernet FCS for each frame; and transmitting the plurality of frames over a network. In each of the plurality of frames, the Ethernet header precedes the FCoE encapsulation header, which precedes the Fiber Channel header, which precedes the data. The data is followed by the Fiber Channel CRC, which is followed by the Ethernet FCS.

20 Claims, 10 Drawing Sheets

STATELESS FIBRE CHANNEL SEQUENCE ACCELERATION FOR FIBRE CHANNEL TRAFFIC OVER ETHERNET

This application is a continuation of application Ser. No. 12/337,467, filed Dec. 17, 2008. The above-referenced United States patent application is hereby incorporated by reference herein in its entirety.

FIELD OF THE INVENTION

This invention relates generally to computer network communications and more specifically to accelerated frame processing in a Fibre Channel over Ethernet network.

BACKGROUND OF THE INVENTION

Fibre Channel is a well known standard for storage networks. It is generally used for applications where high data transmission rates and high reliability are necessary. Ethernet is a network communication standard traditionally used for applications for which the data transmission rate and reliability requirements are not as high as they are for Fibre Channel applications. For example, Ethernet is often used as a base layer for TCP/IP networks, which are in turn used for Internet networking. However, recent developments have brought about Ethernet technology featuring data transmission rates and reliability similar to those of Fibre Channel. An example is the converged enhanced Ethernet (CEE) currently being developed at the IEEE standards body.

Since Ethernet is very prevalent, there have been suggestions to move applications that traditionally rely on Fibre Channel (such as, for example, storage networking) to CEE or other types of Ethernet networks. This would save resources as it would remove the necessity of building and supporting two separate networks in an organization (i.e., a Fibre Channel network for storage and an Ethernet network for Internet access, computer to computer communications, etc).

Consequently, Fibre Channel over Ethernet (FCoE) is proposed as a way of mapping Fibre Channel frames over selected Ethernet networks. A description of the FCoE protocol can be found in an ANSI/INCITS T11 committee document 07-303v0 dated May 2007. Essentially, FCoE maps Fibre Channel natively over Ethernet while being independent of the Ethernet forwarding scheme. The FCoE protocol specification replaces the FC0 and FC1 layers of the Fibre Channel stack with Ethernet. By retaining the native Fibre Channel constructs, FCoE allows a seamless integration with existing Fibre Channel networks and management software. Computers using FCoE typically use a Converged Network Adapter (CNA), which is both a Fibre Channel Host Bus Adapter (HBA) and an Ethernet Network Interface Card (NIC) to the server, but appears as a single Ethernet NIC to the network. CNAs provide an evolutionary approach to consolidation of a server's I/O over a single network (Ethernet) reducing network complexity in the Data Center.

Nevertheless, existing NICs, when used as FCoE CNAs, may not be optimized to offer the best performance and efficiency for their host devices. Particularly because the typical FCoE traffic, such as data transfer in a storage network, tends to have multi-frame sequences as part of an input/output (I/O) operation, there may be potential performance degradation due to individualized processing of frames in the sequences and the excessive number of interrupts and data copies during the operation. Data placement may be another issue with the existing NIC cards when used for FCoE traffic. In particular, the consumers of SCSI services such as file systems and other user applications may provide data buffers that are used for I/O data transfer. But when incoming frames arrive from the network, they are first stored in a list of empty buffers of the standard NIC driver interface where a decapsulation process has to be performed on each of the frames. Then, the decapsulated frames have to be copied from the buffers of the standard NIC to the I/O buffers of the SCSI devices. The decapsulation and copying steps may also negatively affect the performance of the central processing unit (CPU). One of the currently available solutions involves implementing a complete I/O offload in the Fibre Channel HBAs that are available today. However, it is very difficult and costly to include, in the currently available Fibre Channel HBAs, complex, state-full logic to understand FCP, FC2 protocols and perform complete I/O management functions including error condition handling and recovery. Therefore, a more efficient and less complex solution for handling Fibre Channel traffic is desired.

SUMMARY OF THE INVENTION

Embodiments of the present invention provide a more efficient way of processing I/O operations in a FCoE network device without requiring excessive consumption of CPU cycles or having to implement costly modifications to the hardware. In one embodiment, this is achieved by modifying the existing CNA to include a Fibre Channel Sequence Offload Interface and corresponding Sequence Offload Modules in the hardware that are adapted to implement offloads, thereby relieving the burden on the CPU of the host device.

In general, the Fibre Channel Sequence Offload Interface is adapted to provide less complex, stateless offloads for accelerating transmission and reception of Fibre Channel sequences. On the transmission side, the interface is designed to specify transmission of a complete data sequence using a single request instead of making individual requests for each frame in the sequence, thereby reducing the workload of the CPU. On the receiving side, the interface allows for registration of the upper layer SCSI buffers directly with the Ethernet NIC so that the incoming frames can be put in the SCSI buffer directly without having to store the frames in a buffer queue temporarily. Doing so eliminates the extra copying steps between the buffer queue and the SCSI buffers, thereby further reducing the load on the CPU of the device and speeding up the I/O operation.

In one embodiment, an accelerated CNA using the disclosed Fibre Channel Sequence offload technology is provided. The accelerated CNA includes some of the same basic components of the conventional CNA, such as a TCP/IP stack, a SCSI stack, a Fibre Channel driver, a FCoE Encapsulation/Decapsulation module, and a L2 NIC driver. The TCP/IP stack communicates with the L2 NIC driver through an Ethernet frame level interface. Together, the TCP/IP stack and the L2 NIC driver handles the TCP/IP traffic (i.e., non-FCoE traffic). The SCSI stack communicates with the Fibre Channel driver through a SCSI I/O interface. The Fibre Channel driver communicates with the FCoE Encapsulation/Decapsulation module through a Fibre Channel frame level interface. The SCSI stack, the Fibre Channel driver, and the FCoE Encapsulation/Decapsulation module are used exclusively for processing FCoE requests. All incoming and outgoing traffic, including both FCoE and non-FCoE data transfers, passes through an Ethernet NIC which serves as a gateway to the external Ethernet network.

This embodiment of the accelerated CNA also includes a Fibre Channel Sequence Offload Interface. The Fibre Channel Sequence Offload Interface may be a part of the standard L2 NIC driver or as a standalone component of the accelerated CNA. The Fibre Channel Sequence Offload Interface may include a Fibre Channel Transmit Sequence Offload Interface and a Fibre Channel Receive Sequence Offload Interface. In this embodiment, the FCoE Encapsulation/Decapsulation module communicates with the Fibre Channel Sequence Offload Interface instead of the standard L2 NIC driver as in the existing CNAs. Here, the L2 NIC driver only processes non-FCoE frames that are originated from or destined to the TCP/IP stack.

The actual sequence offloads are performed by special hardware inside the Ethernet NIC. In this embodiment, the special hardware includes a Fibre Channel Transmit Sequence Offload module and a Fibre Channel Receive Sequence Offload Module. Those sequence offload modules in the Ethernet NIC may be linked to the Fibre Channel Sequence Offload Interface by certain application programming interfaces (APIs). In particular, the Fibre Channel Transmit Offload Interface interfaces with the Fibre Channel Transmit Sequence Offload Module and the Fibre Channel Receive Transmit Offload Interface interfaces with the Fibre Channel Receive Sequence Offload Module in the Ethernet NIC. In this embodiment, the Fibre Channel Sequence Offload Interface plays a central role in directing the Fibre Channel offload modules to accelerate the FCoE I/O operations for the CNA.

In this embodiment, the upper layer SCSI buffers are connected directly to the Fibre Channel Receive Sequence Offload Module of the Ethernet NIC. In addition, a general buffer is shown to be available to non-FCoE frames. As will be discussed in detail below, significant performance advantages can be achieved by eliminating frame transfers between the buffer queue and the SCSI buffers during the frame-receiving process. However, the transmission side of a typical I/O request handled by the disclosed accelerated CNA is discussed first in the following paragraphs.

DETAILED DESCRIPTION OF THE PREFERRED EMBODIMENTS

In the following description of preferred embodiments, reference is made to the accompanying drawings which form a part hereof, and in which it is shown by way of illustration specific embodiments in which the invention can be practiced. It is to be understood that other embodiments can be used and structural changes can be made without departing from the scope of the embodiments of this invention.

In general, the present invention discloses systems and methods to implement less complex, state-less offloads for accelerating transmission and reception of Fibre Channel data sequences. The stateless nature of the offloads make it less complex as compared to standard Fibre Channel HBAs while offering tremendous performance benefit to host CPUs through the sequence offload mechanisms disclosed in the invention. It also defines systems and methods to register I/O buffers with the CNA and provide means to copy data directly to and from the SCSI I/O buffers without the use of data buffers in the NIC.

To better illustrate the advantages and improvements offered by the embodiments of the present invention, it is worthwhile to take a closer look at the currently available Fibre Channel HBAs and FCoE CNAs. The following paragraphs describe in detail some of the existing HBAs and CNAs and their shortcomings.

Figure 1:
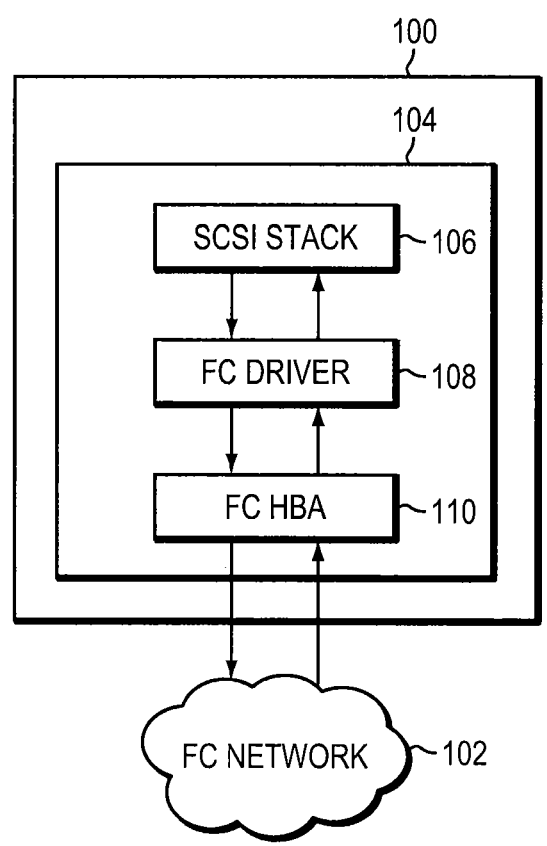
FIG. 1 is a block diagram illustrating a conventional storage device including a Fibre Channel Host Bus Adapter for communicating with a Fibre Channel network.

FIG. 1 illustrates a host device 100 containing a basic Fibre Channel network interface 104 for communicating with a Fibre Channel network 102. As illustrated, the network interface 104 includes a SCSI stack 106, a Fibre Channel driver 108, and a Fibre Channel host bus adapter (HBA) 110. In operation, the SCSI stack 106 sends an I/O request via an interface (not shown) to the Fibre Channel driver 108. A typical I/O request may be for a transfer of a certain amount of data from the host device to another device on the Fibre Channel network 102. The transfer of data may be divided into three phases, namely the command phase during which the transfer is initialized, the data transfer phase during which data is transferred, and the response phase during which the status of the transfer is confirmed. After receiving the request from the SCSI stack 106, the Fibre Channel driver 108 forwards the request to the Fibre Channel HBA 110. The Fibre Channel HBA 110 in turn sends the request out to the network 102. When the transfer of data is complete, the Fibre Channel HBA 110 receives a status indication as to whether the transfer was successful or not. The status indication is then passed on to the Fibre Channel driver 108 and then to the SCSI stack 106. If the request is not successful, the SCSI stack 106 may re-initiate the operation.

In this particular network interface, the Fibre Channel MBA 110 is responsible for executing the request, from the initial command phase through the final response phase. In other words, each of the three phases of the I/O operation is completely handled by the Fibre Channel HBA 110. This constitutes a complete I/O offload as the operating system (OS) and the CPU of the host device 100 are completely uninvolved after the initial request is made by the SCSI stack 106. All remaining steps in this I/O operation are performed by the Fibre Channel MBA 110. One of the advantages of having a complete I/O offload is that CPU cycles are not spent on processing individual frames, thereby improving efficiency of the data transfers. However, in order to achieve complete I/O offload, a large amount of logic operations has to be included in the firmware of the Fibre Channel HBA. This could significantly increase the manufacturing cost, complexity, and power consumption of the Fibre Channel HBAs, making it a less than perfect solution for network communication.

Figure 2:
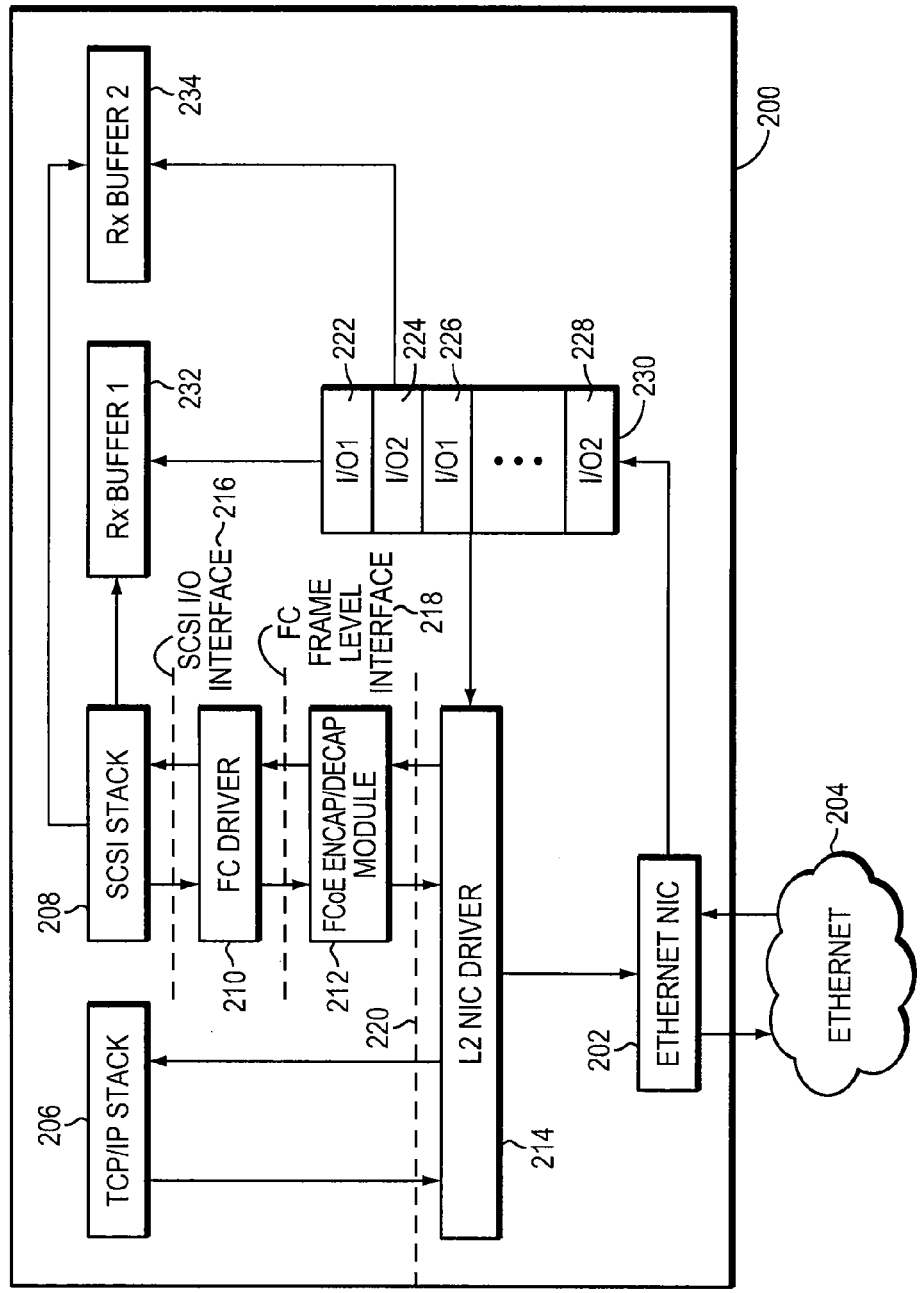
FIG. 2 is a block diagram illustrating a conventional converged network adapter (CNA) capable of handling both FCoE and non-FCoE data transmissions.

Network interfaces for FCoE networks are typically more sophisticated than those for Fibre Channel networks. That is because that the network interfaces for FCoE networks often have to be able to process both Fibre Channel data and Ethernet data. As such, CNAs are typically used for a host device connected to a FCoE network. FIG. 2 illustrates a conventional CNA (i.e., FCoE converged NIC) 200 that includes a TCP/IP stack 206, a SCSI stack 208, a FC driver 210, a FCoE Encapsulation/Decapsulation module 212, a L2 NIC driver 214, and a Ethernet NIC 202. In addition, the CNA 200 includes a number of SCSI buffers 232, 234 accessible by the SCSI stack 208. The SCSI stack 208 communicates with the FC driver 210 through a SCSI I/O interface 216. The FC driver 210 communicates with the FCoE Encapsulation/Decapsulation module 212 through a FC frame level interface 218. The Encapsulation/Decapsulation module 212, in turn, communicates with the L2 NIC driver 214 through an Ethernet frame level interface 220. The L2 NIC driver 214 interacts with the Ethernet NIC 202 which serves as the link to the external Ethernet network 204. There is also a buffer queue 230 which provides temporary storage for incoming frames before the frames are processed by the L2 NIC diver 214.

Depending on the types of frames being handled by the CNA 200, different components of the CNA 200 may be put to use. In particular, all FCoE traffic originated or received by the CNA 200 goes through the SCSI stack 208, the FC driver 210, and the FCoE Encapsulation/Decapsulation module 212. Non-FCoE traffic, such as TCP/IP packets, are handled by the TCP/1P stack 206. The L2 NIC diver 214 is connected to both the Encapsulation/Decapsulation module 212 and the TCP/IP stack 206 and thus is capable of processing both FCoE and non-FCoE frames.

Figure 3:
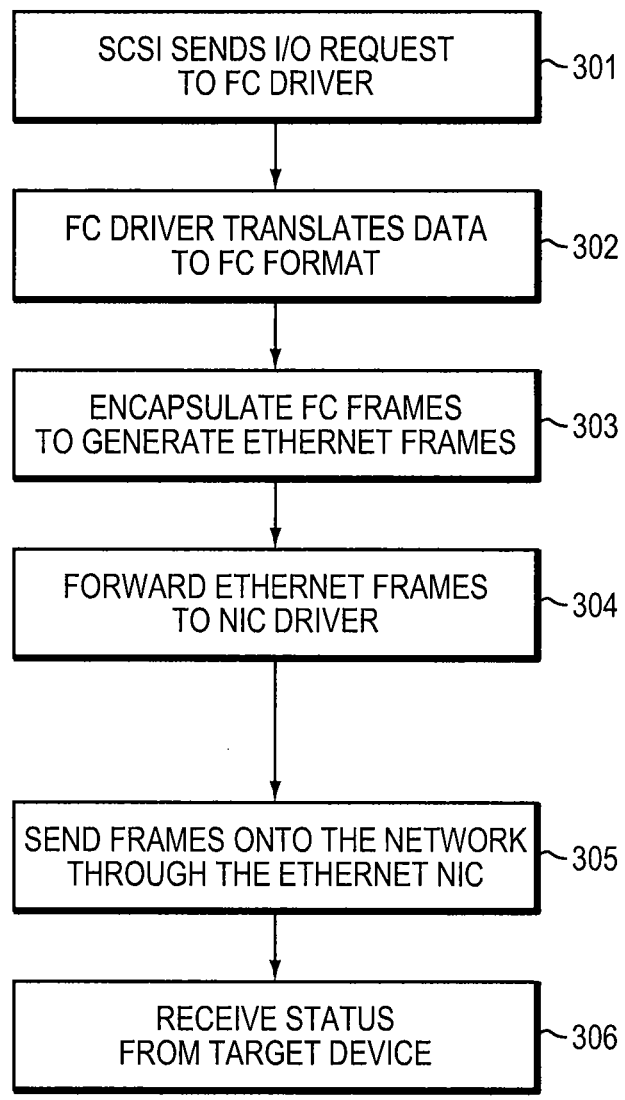
FIG. 3 is a flow chart illustrating the exemplary steps in a typical transmit request performed by the CNA of FIG. 2.
Figure 4:
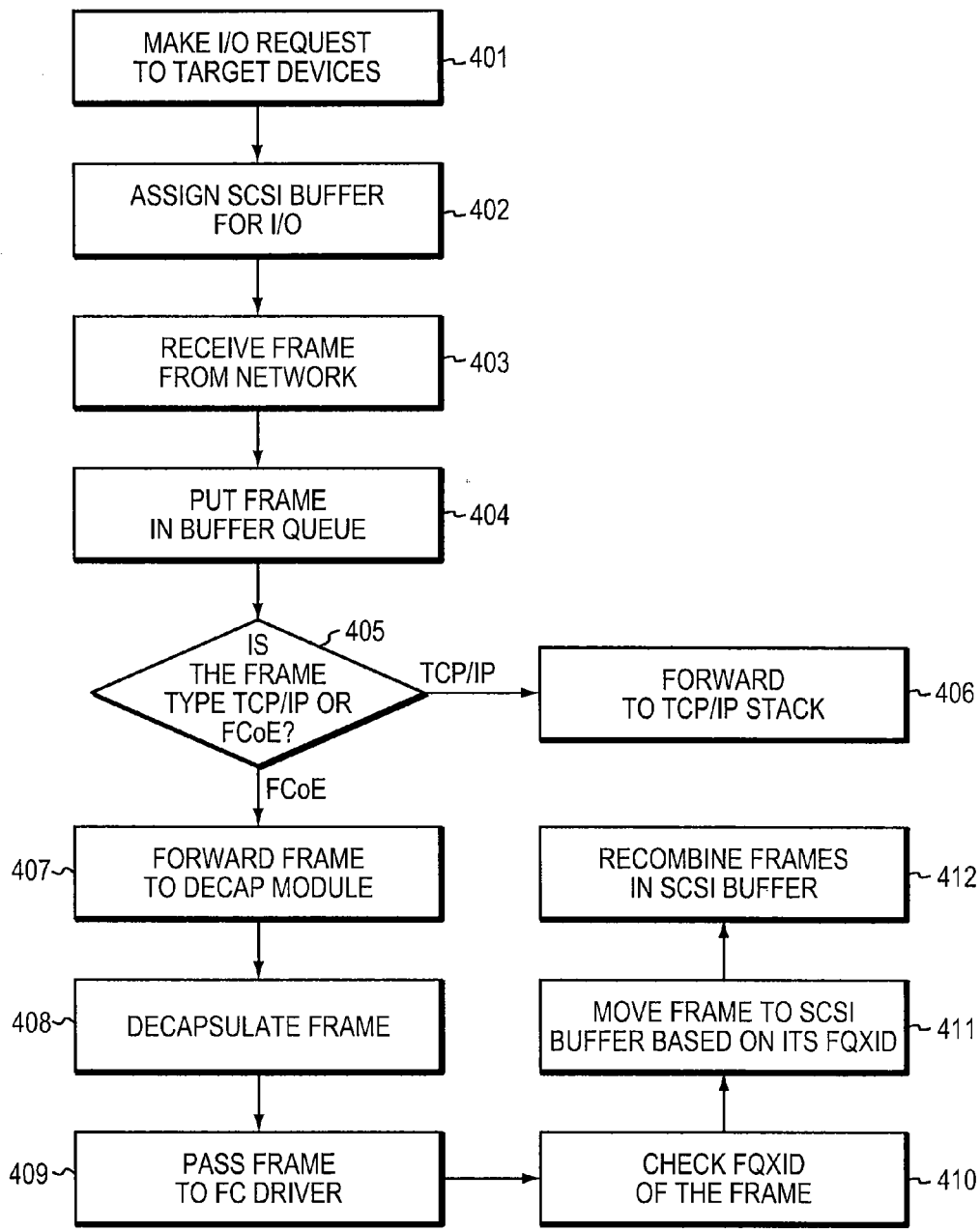
FIG. 4 is a flow chart illustrating the exemplary steps in a typical receive request performed by the CNA of FIG. 2.

The CNA 200 of FIG. 2 is designed to handle both outbound and inbound data transfers for its host device. FIGS. 3 and 4 illustrate the steps in exemplary I/O requests processed by the CNA for transmitting and receiving data frames, respectively.

First, the transmitting of data from the CNA is described in view of FIG. 3. The process starts with the SCSI stack making an I/O request to the Fibre Channel driver (step 301). The I/O request may be, for example, a write of 64 kB of data from the host device to another device on the network. As described above, the I/O may be divided into a command phase, a data transfer phase, and a response phase. The number of frames used to transport the 64 kB of data over the network may depend on the size of the data and the size of each frame. For example, the 64 kB may be equally divided and stored in 32 frames, each containing 2 kB of data. In addition to the 32 data frames, one more frame is needed to carry information for the command phase and another frame for the status phase. As such, a total of 34 frames are transmitted in response to this particular I/O request.

Once the request is received by the Fibre Channel driver, the Fibre Channel driver converts the outgoing data into Fibre Channel format (step 302). Because the network in this example is using the FCoE protocol, the Fibre Channel frames have to be encapsulated by the FCoE encapsulation layer to generate the corresponding Ethernet frames (step 303) so that those Ethernet frames can traverse the actual physical Ethernet wire. The encapsulated frames are passed on to the L2 NIC driver (step 304), which then instructs the Ethernet NIC to put the frames out on the Ethernet network (step 305). After the data reaches the target device, the target device informs the storage device (i.e., the sender) about the status of the transmission by sending back a status frame (step 306).

It is important to note that, in this type of existing CNAs, each of the frames of the data sequence has to be processed separately. That is, the Fibre Channel driver has to break up the data into individual frames when it receives the request. Individual requests, one for each frame, are then made to the FCoE encapsulation module. In turn, the encapsulation module must enqueue one request per frame to the L2 NIC driver. As a result, each data transfer may require one time than necessary to complete. In addition, because the CPU of the host device is responsible for executing each of these steps for every frame in the sequence, a significant amount of processing power may be consumed by the I/O requests, which would negatively affect the performance of other applications on the host device that are competing for CPU cycles. Therefore, the existing CNA of FIG. 2 is also not the best solution for performing I/O operations for a FCoE enabled host device.

On the receiving side, the process is typically more complicated because usually not all the incoming data frames for an I/O request arrive in a single batch. Data frames for one I/O may be mixed with frames for another I/O when they are received by the CNA. As a result, the frames for each I/O may have to be sorted out and regrouped before they can be recombined to generate the requested data.

Referring again to FIG. 2, in this existing CNA 200, the L2 NIC driver 214 provides a buffer queue 230 to the Ethernet NIC 202 for receiving incoming frames. The buffer queue 230 can temporarily store incoming frames from the network before the frames are processed by the NIC driver 214. In addition, the CNA 200 includes a number of SCSI buffers 232, 234 that are accessible by the SCSI stack 208. For illustration purposes, only two SCSI buffers 232, 234 are shown in FIG. 2 although more may exist as a part of the CNA architecture. Each of the SCSI buffers 232, 234 may be used to receive and store frames of a specific I/O request.

FIG. 4 illustrates the exemplary steps of receiving data from the Ethernet network by the CNA of FIG. 2 in response to an I/O request. In this example, the I/O request, such as a read command, is sent out by the NIC to one or more target device(s) on the network, requesting 64 kB of data from the target device(s) (step 401). Again, if 2 kB frames are used to transmit the 64 kB of data, there will be a total of 32 frames arriving from the target device(s) over the Ethernet network. In anticipation of the incoming frames, one of the SCSI buffers is assigned to receive all data frames associated with this particular I/O request (step 402). Since the receiving device may have multiple I/O requests pending at the same time, frames for other I/Os may be mixed with the 32 frames for this particular request. As a result, all incoming frames have to be examined and sorted after they are received by the CNA to determine of which I/O request they are a part. Specifically, when the CNA receives a frame from the network (step 403), the frame is first put in the buffer queue (step 404). The buffer queue may be updated every time a new frame is added to it or an existing frame in the queue is removed. As different frames for different I/Os arrive, they may be put in the buffer queue in the order they are received, regardless of which I/O they belong to. Because the CNA is adapted to handle both FCoE and non-FCoE data, some of the incoming frames may carry TCP/IP payload and some may carry FCoE payload. To make sure that each frame is grouped with the other frames for the same I/O and stored in the assigned SCSI buffer, the NIC driver has to check the frame type of each received frame (step 405). If the frame is a TCP/IP frame, it is forward to the TCP/IP stack for further process (step 406). If the frame is a FCoE frame, it is sent to the decapsulation module (step 407). This examination process is done on a frame-by-frame basis.

When multiple FCoE I/O requests are being processed at the same time, the incoming frames have to be sorted not only by their frame types (e.g., TCP/IP vs. FCoE), but also by their corresponding I/O requests. Referring back to FIG. 2, the buffer queue 230 is shown to contain frames for two different FCoE I/Os (i.e., I/O1 and I/O2). The frames are stored in the order in which they were received. As illustrated, the first and third frames 222, 226 in the buffer queue 230 are part of the data sequence of I/O1. The second and last frames 224, 228 in the queue 230 are a part of the data sequence of I/O2. When the NIC driver 214 checks the frame type of each of the frames in the queue 230, it only recognizes that the first three frames and the last frame in the queue 230 are of the FCoE type. However, the NIC driver 214 cannot distinguish the FCoE frames further based on their corresponding I/Os.

Referring now to FIG. 4, in order to direct each frame to the SCSI buffer assigned to its respective I/O, the frames have to be further processed by the decapsulation module and the Fibre Channel driver. The decapsulation module converts the frames into Fibre Channel format (step 408) before passing them to the Fibre Channel driver (step 409). The Fibre Channel driver then checks the frame's Fully Qualified Exchange ID (FQXID) to determine the I/O that this frame belongs (step 410). In this example, the FQXID for the I/O1 frames would be different from the FQXID for those I/O2 frames. Based on the frames' FQXID, the Fibre Channel driver can then put each frame in the SCSI buffers assigned to the corresponding I/O request (step 411). In this example, all frames for I/O1 (e.g., the first and third frames in the buffer queue of FIG. 2) are copied into the first SCSI buffer 232. All frames for I/O2 (e.g., the second and last frames in the buffer queue of FIG. 2) are copied into the second SCSI buffer 234. Once all the frames for a particular I/O are collected in the assigned SCSI buffer, they can be recombined into data that can be used by whichever program that made the I/O request (step 412).

As detailed above in view of FIG. 4, the design of the existing CNAs does not provide the most efficient ways for possessing incoming data frames. Just as how the typical CNA handles the transmission of outbound frames, every inbound data frame has to be processed individually by the CPU because there is no proper logic built in the hardware of the NIC driver to provide at least some of the verification and modification of the frames. For example, the CPU of the host device has to be involved in decapsulating the frames and checking the FQXID of each decapsulated frame. Each of these operations consumes CPU cycles. Consequently, there may be significant performance degradation in the system. Furthermore, the received frames have to be copied from the buffer queue where they are initially stored to the SCSI buffer during the receiving process, these extra copy steps put additional demand on CPU resources and slow down the I/O operations.

Embodiments of the present invention provide a more efficient way of processing I/O operations in a FCoE network device without requiring excessive consumption of CPU cycles or having to implement costly modifications to the hardware. In one embodiment, this is achieved by modifying the existing CNA (e.g., the CNA of FIG. 2) to include a Fibre Channel Sequence Offload Interface and corresponding Sequence Offload Modules in the hardware that are adapted to implement offloads, thereby relieving the burden on the CPU of the host device.

In general, the Fibre Channel Sequence Offload Interface is adapted to provide less complex, stateless offloads for accelerating transmission and reception of Fibre Channel sequences. On the transmission side, the interface is designed to specify transmission of a complete data sequence using a single request instead of making individual requests for each frame in the sequence, thereby reducing the workload of the CPU. On the receiving side, the interface allows for registration of the upper layer SCSI buffers directly with the Ethernet NIC so that the incoming frames can be put in the SCSI buffer directly without having to store the frames in a buffer queue temporarily. Doing so eliminates the extra copying steps between the buffer queue and the SCSI buffers, thereby further reducing the load on the CPU of the device and speeding up the I/O operation.

Figure 5:
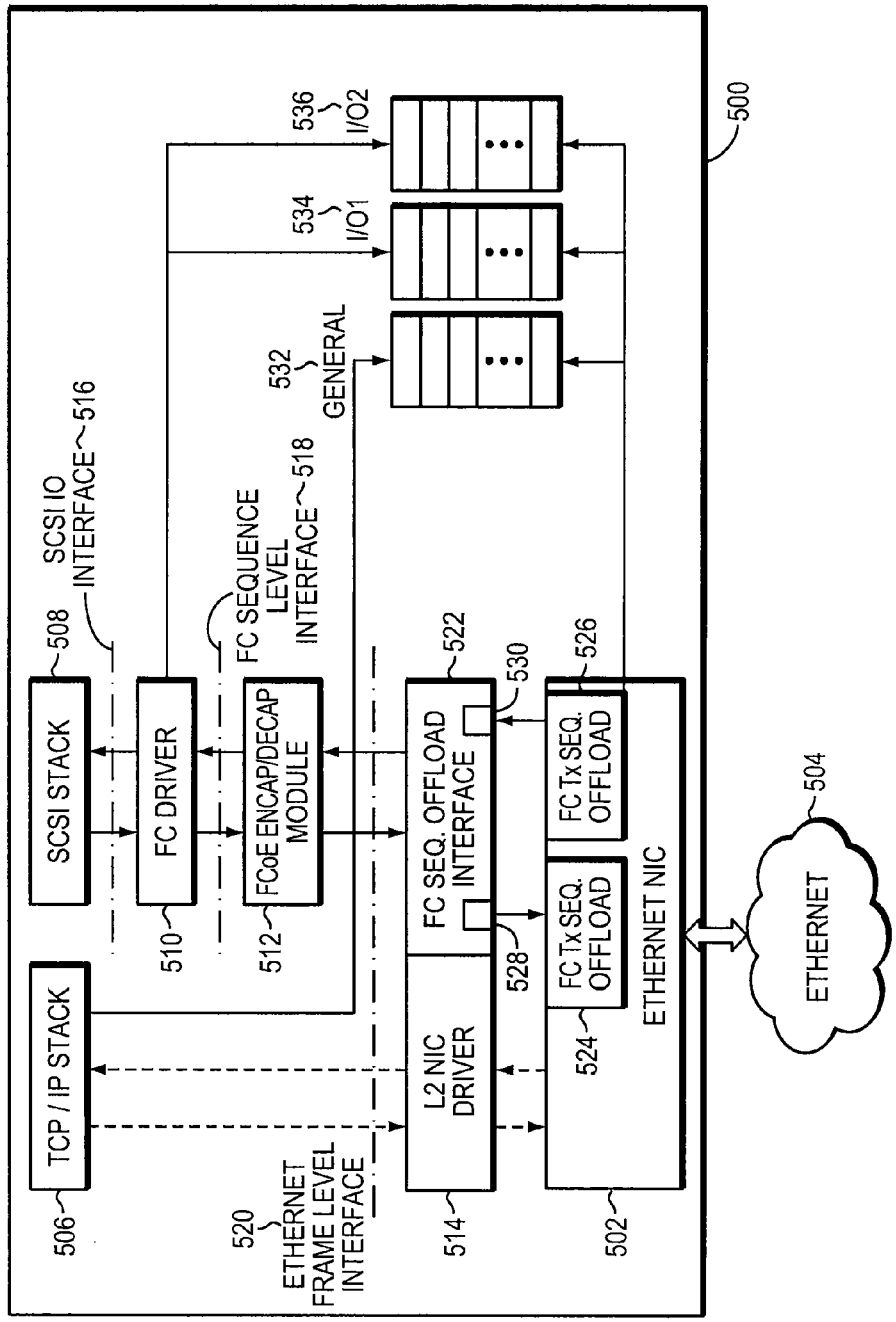
FIG. 5 is a block diagram illustrating an exemplary accelerated CNA according to embodiments of the present invention.

FIG. 5 illustrates an exemplary CNA (hereinafter referred to as accelerated CNA) using the disclosed Fibre Channel Sequence offload technology according to an embodiment of the invention. As illustrate in FIG. 5, the accelerated CNA includes some of the same basic components of the conventional CNA, such as the one illustrated in FIG. 2. For example, the CNA of FIG. 5 includes a TCP/IP stack 506, a SCSI stack 508, a Fibre Channel driver 510, a FCoE Encapsulation/Decapsulation module 512, and a L2 NIC driver 514. The TCP/IP stack 506 communicates with the L2 NIC driver 514 through an Ethernet frame level interface 520. Together, the TCP/IP stack 506 and the L2 NIC driver 514 handles the TCP/IP traffic (i.e., non-FCoE traffic). The SCSI stack 508 communicates with the Fibre Channel driver 510 through a SCSI I/O interface 516. The Fibre Channel driver 510 communicates with the FCoE Encapsulation/Decapsulation module 512 through a Fibre Channel frame level interface 518. The SCSI stack 508, the Fibre Channel driver 510, and the FCoE Encapsulation/Decapsulation module 512 are used exclusively for processing FCoE requests. All incoming and outgoing traffic, including both FCoE and non-FCoE data transfers, passes through an Ethernet NIC 502 which serves as a gateway to the external Ethernet network 504.

One of the differences between this embodiment of the accelerated CNA and the one conventional CNA of FIG. 2 is that this accelerated CNA includes a Fibre Channel Sequence Offload Interface 522. The Fibre Channel Sequence Offload Interface 522 may be a part of the standard L2 NIC driver 514 as illustrated in FIG. 5 or as a standalone component of the accelerated CNA 500. The Fibre Channel Sequence Offload Interface 522 may include a Fibre Channel Transmit Sequence Offload Interface 528 and a Fibre Channel Receive Sequence Offload Interface 530. In this embodiment, the FCoE Encapsulation/Decapsulation module 512 communicates with the Fibre Channel Sequence Offload Interface 522 instead of the standard L2 NIC driver 514 as in the existing CNAs. Here, the L2 NIC driver 514 only processes non-FCoE frames that are originated from or destined to the TCP/IP stack 506.

The actual sequence offloads are performed by special hardware inside the Ethernet NIC 502. In this embodiment, the special hardware includes a Fibre Channel Transmit Sequence Offload module 524 and a Fibre Channel Receive Sequence Offload Module 526. Those sequence offload modules 524, 526 in the Ethernet NIC 502 may be linked to the Fibre Channel Sequence Offload Interface by certain application programming interfaces (APIs). In particular, the Fibre Channel Transmit Offload Interface 528 interfaces with the Fibre Channel Transmit Sequence Offload Module 524 and the Fibre Channel Receive Transmit Offload Interface 530 interfaces with the Fibre Channel Receive Sequence Offload Module 526 in the Ethernet NIC 502. In this embodiment, the Fibre Channel Sequence Offload Interface 522 plays a central role in directing the Fibre Channel offload modules 524, 526 to accelerate the FCoE I/O operations for the CNA 500.

Another difference between the accelerated CNA of FIG. 4 and the conventional CNA of FIG. 2 is that there is no buffer queue in the CNA 500 for temporary storage of received frames before the frames are processed and copied to the upper layer SCSI buffers. As illustrated in FIG. 5, in this embodiment, the upper layer SCSI buffers 534, 536 are connected directly to the Fibre Channel Receive Sequence Offload Module 526 of the Ethernet NIC 502. In addition, a general buffer 532 is shown to be available to non-FCoE frames. As will be discussed in detail below, significant performance advantages can be achieved by eliminating frame transfers between the buffer queue and the SCSI buffers during the frame-receiving process. However, the transmission side of a typical I/O request handled by the disclosed accelerated CNA is discussed first in the following paragraphs.

Figure 6:
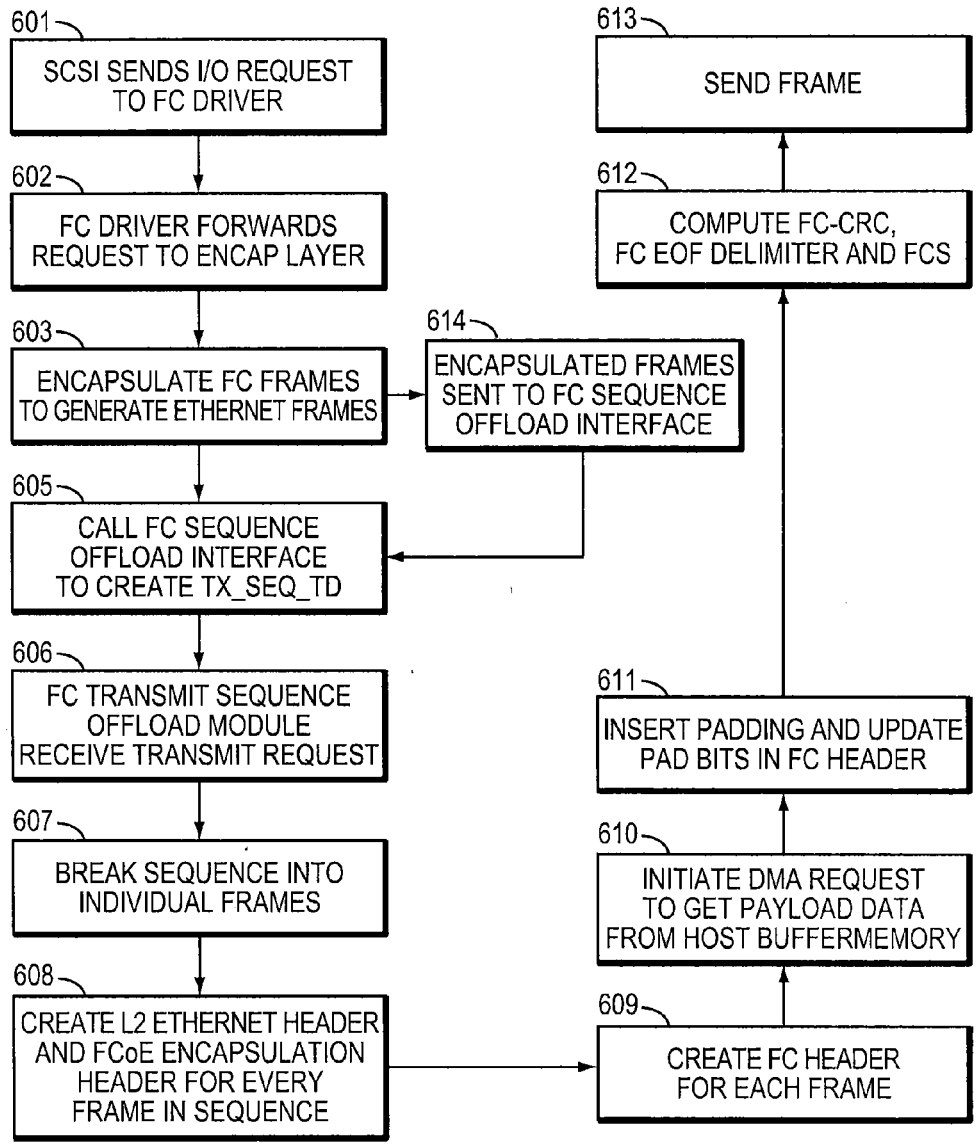
FIG. 6 is a flow chart illustrating the exemplary steps in a typical transmit request performed by the CNA of FIG. 5 according to embodiments of the present invention.

FIG. 6 illustrates the steps of a transmission of Fibre Channel data sequence(s) using the accelerated CNA of FIG. 5. Again, a write of 64 kB of data from the host device to a target device on the Ethernet network is used as the exemplary I/O request. As previously discussed, the I/O operation may be divided into a command phase, a data transfer phase, and a response phase. The 64 kB of data may be carried in one or more data sequences, each sequence including one or more frames. For example, the data may be transported in 32 2 kB frames in one or more sequences.

Although the I/O request remains the same, the accelerated CNA handles the request in a significantly different way from how a conventional CNA would handle it. With the addition of the Fibre Channel Sequence offload Interface and the Fibre Channel Sequence Offload Modules in the Ethernet NIC, the accelerated CNA of FIG. 5 is capable of performing sequence offloads to reduce the work-load on the CPU of the device. Referring back to FIG. 6, first, the SCSI stack 408 sends the I/O request to the Fibre Channel driver (step 601). Once the Fibre Channel driver receives the request, instead of breaking the request into 32 individual frames as it would for a conventional CNA (e.g., the CNA of FIG. 2), the Fibre Channel driver keeps the frames in the one or more sequences and specifies the necessary information for the transmission of all the sequences in one request to the CPU of the host device. The necessary information may include, for example, the amount of data to be transmitted and the number of sequences in the transmission. The request is then forwarded to the FCoE encapsulation layer (step 602), where the Fibre Channel frames are encapsulated to generate corresponding Ethernet frames (step 603) so that they can later traverse the physical Ethernet cable.

The encapsulated frames are sent to the Fibre Channel Sequence Offload Interface (step 604). As previously mentioned, the Fibre Channel Sequence Offload Interface, along with the Fibre Channel sequence offload modules n the Ethernet NIC, plays an essential role in performing sequence offloads in the transmission of data. In particular, the Fibre Channel Sequence Offload Interface is defined to allow the Fibre Channel driver to specify transmission of a complete data sequence using a single request. Without this interface, as illustrated in FIG. 3, the Fibre Channel driver has to break up the data sequence into frames and make individual requests to the FCoE encapsulation module for each transmit frame. In turn, the encapsulation module must enqueue one request per frame to the L2 NIC driver. This new Fibre Channel Sequence Offload Interface completely eliminates the need of multiple operations, one per frame, in the various steps of the transmission process by keeping the data frames in their sequences and making a single request for all data frames.

In particular, the Fibre Channel Sequence offload Interface creates a Transmit Sequence Request Descriptor (Tx_Seq_TD) (step 605) to specify the information necessary for performing the Fibre Channel transmit sequence offload on the I/O request. In one embodiment, the Tx_Seq_TD may include information such as L2 header information, FC header information, total transmit size of the request, sequence size for the one or more Fibre Channel sequences, frame size of the one or more Fibre Channel frames in the sequences, start-of-frame delimiter (SOF), end-of-frame delimiter (EOF), a transport-sequence-initiative flag, and S/G list of data buffers. In other embodiments, the Tx_Seq_TD may include additional information about the request or omit one or more of the fields listed above.

Referring again to FIG. 6, after the Tx_Seq_TD is created for the transmission, the Fibre Channel Transmit Sequence Offload Module receives the request from the Fibre Channel Sequence Offload Interface to transmit the one or more Fibre Channel sequences (step 606) over the network. The size of each sequence is specified by the Sequence_Size field in the corresponding Tx_Seq_TD. In this example, given that the Total_Transmit_Size is 64 kB, if the Sequence_Size is defined to be 32 kB, there would be two sequences. If the Sequence_Size is 64 kB, there would only be one sequence in this request.

Once the transmit sequences are received by the Fibre Channel Transmit Sequence Offload Module, the sequences are broken into individual FCoE frames (step 607). Then, a L2 Ethernet header and a FCoE encapsulation header are added to every frame in the sequence (step 608). The L2 Ethernet header is created based on information in the Tx_Seq_TD and typically includes information about the storage device and the target device, such as the addresses of the storage device and the target device. Because all frames are a part of the same transmission, every frame in the sequence(s) may have identical Ethernet header. The FCoE encapsulation header follows the Ethernet header and includes information regarding the FCoE protocol being used in this particular transmission and SOF frame delimiter. The SOF indicates whether the frame is the first frame, a middle frame, or the last frame in the sequence.

In the next step, a Fibre Channel header is added to each frame based on information in the FC Header field of the Tx_Seq_TD (step 609). The Fibre Channel header follows the FCoE header in each frame. The Fibre Channel header also includes an FCIDs for Fibre channel source and destination nodes and Exchange qualifier. In one embodiment, the Exchange qualifier further includes an Originator Exchange Identifier (OX_ID) and a Responder Exchange Identifier (RX_ID). The combination of the OX_ID and the RX_ID may provide a unique ID for the I/O. The Fibre Channel header may also include a sequence ID (SEQ_ID), a sequence count (SEQ_CNT) and a Parameter field. The SEQ_ID can be used to identify a particular sequence of the current I/O and the SEQ_CNT can identify the sequential order of the particular frame of that sequence. The Exchange qualifier (i.e., OX_ID, RX_ID) and SEQ_ID may be the same for every frame in a sequence because all the frames are part of the same sequence, and thus the same exchange (i.e., I/O).

In one embodiment, one or more of these fields in the Fibre Channel header may be modified according to the Fibre Channel protocol specification. For example, if the current transmitted data size is greater than Sequence_Size, a new Fibre Channel sequence may be created based on the current SEQ_ID and SEC_CNT. In particular, the new sequence would have the next SEQ_ID. The SEQ_CNT would be incremented by one for each of the frames in the new sequence. In addition, the FC_header may have its F_CTL bits per transmit frame modified according to the control flags provided in the Tx_Seq_TD. The Parameter field may also be updated according to the size of the transmitted data.

Figure 7:
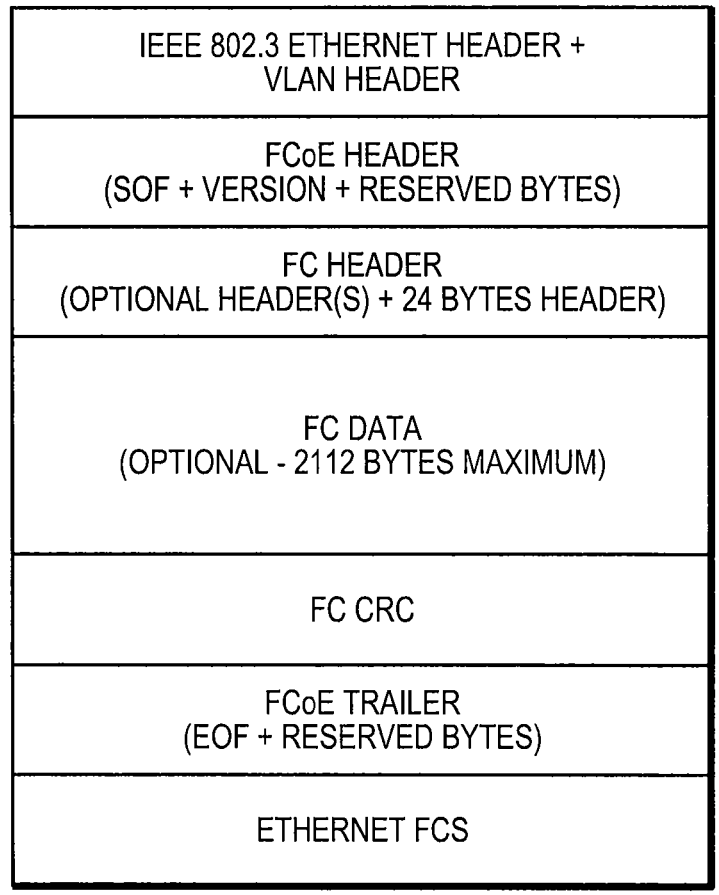
FIG. 7 illustrates an exemplary FCoE frame according to embodiments of the present invention.

Once the Ethernet header, the FCoE header, and the Fibre Channel header are created and attached to each of the data frames. Next a DIVIA request is initiated using SIG list provided in Tx_Seq_TD (step 610) to get the required amount of payload data from the host memory buffers. The payload makes up the data portion of each frame. Subsequently, the required padding is inserted into the last data frame of the sequence and the PAD indication bits in the FC header (F_CTL) is updated accordingly (step 611). Finally, the Fibre Channel Cyclic Redundancy Checksum (CRC), FC EOF delimiter, and Ethernet frame sequence (FCS) are computed (step 612) and attached to the end of the frame. The EOF delimiter indicates whether a given frame is the last frame of the sequence or not. Both the FC CRC and the Ethernet FCS are typically used for error detection. Finally, the FCoE frame is sent out to the Ethernet network (step 613). Steps 508-514 are repeated for each frame in the sequence(s) until all frames are sent. This can be verified when the Total_Transmit_Size has been transmitted. An exemplary FCoE frame generated based on the process described above is shown in FIG. 7.

Optionally, upon successful transmission of the transmit data sequences, a pre-defined "good" status frame can be automatically generated by the sequence accelerator. The status frame is built using the information provided in the Fibre Channel header field of the Tx_Seq_TD. By automating the status phase, further savings in the host CPU utilization can be realized.

To summarize, the Fibre Channel Sequence Offload Interface and the modified transmit sequence logic in the hardware (e.g., the offload modules in the Ethernet NIC) allows the Fibre Channel driver to specify transmission of a complete data sequence using a single transmit request instead of making individual request for each frame in the sequence. This is accomplished by creating a Transmit Sequence Request Descriptor (Tx_Seq_TD) that contains the information necessary to perform sequence acceleration in the hardware. The Fibre Channel Sequence Offload Interface sends the entire request with the Tx_Seq_TD to the sequence offload modules in the hardware, which then performs all the Fibre Channel processing on the sequence using the information in the Tx_Seq_TD. As a result, the sequence is broken down into individual frames and each frame is modified before being sent out to the external network. By embedding the necessary logic in the hardware and using the hardware, instead of the CPU, to process the sequence, the data transmission process is accelerated. The CPU no longer has to process each individual data frame in a transmission. Thus, significant performance improvement can be obtained in terms of eliminated CPU cycles. In addition, the stateless nature of the offloads makes the embodiments of this invention less complex to implement compared to incorporating additional logic in a standard Fibre Channel HBA while still achieving significant performance benefit over the frame-by-frame transmission done by a conventional CNA. The hardware logic can interleave frames from various outstanding exchanges to further improve the performance and response time to different I/Os. The hardware logic must maintain frame-to-frame timing requirements between frames of the same sequence as specified in the FC protocol.

On the receiving end, embodiments of the present invention again incorporate the sequence acceleration technology to perform sequence offloads on the received data frames. In addition, the embodiments also provide means to copy data directly to and from the upper layer SCSI buffers without the need of a buffer queue for temporary storage.

Figure 8A:
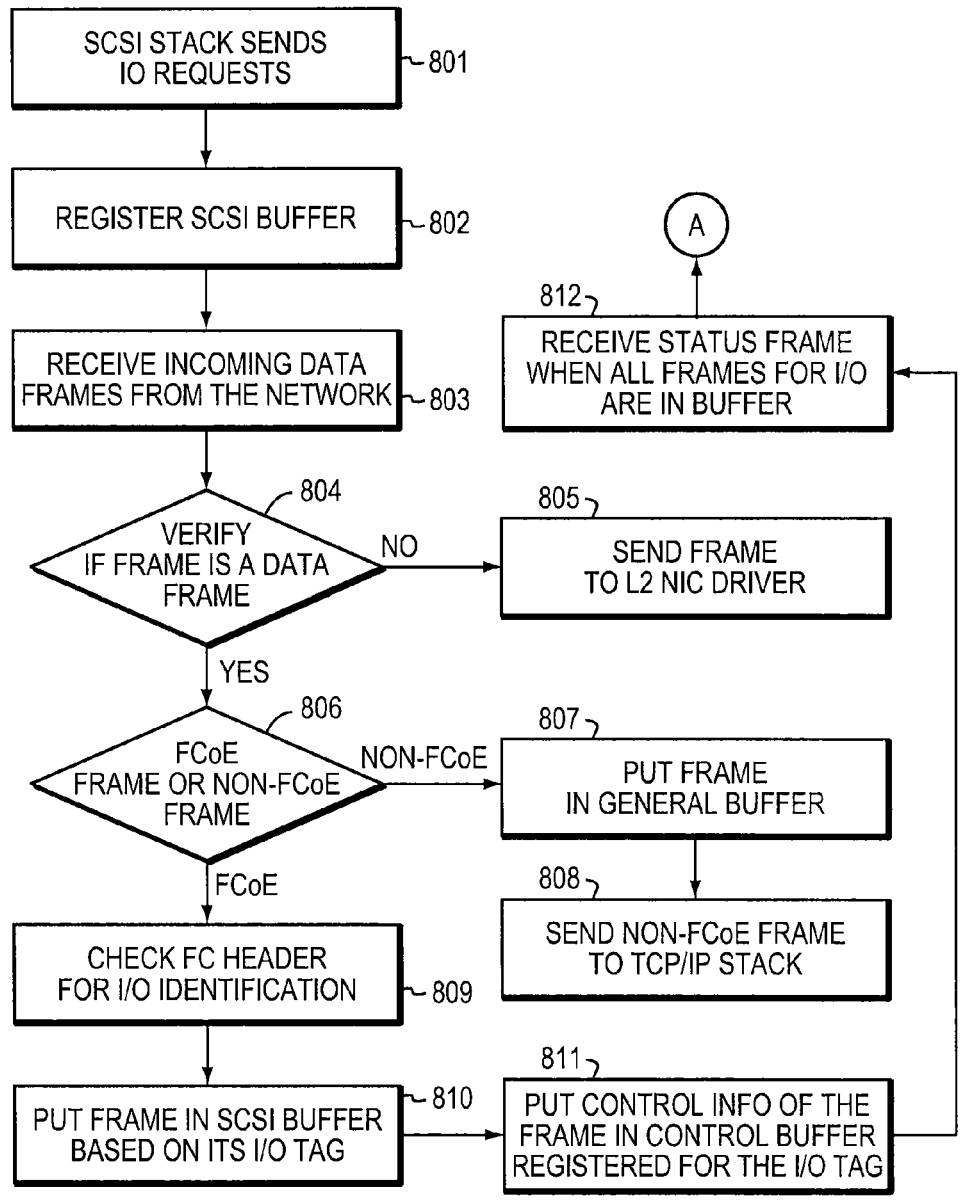
FIGS. 8a and 8b are flow charts illustrating the exemplary steps in a typical receive request performed by the CNA of FIG. 5.
Figure 8B:
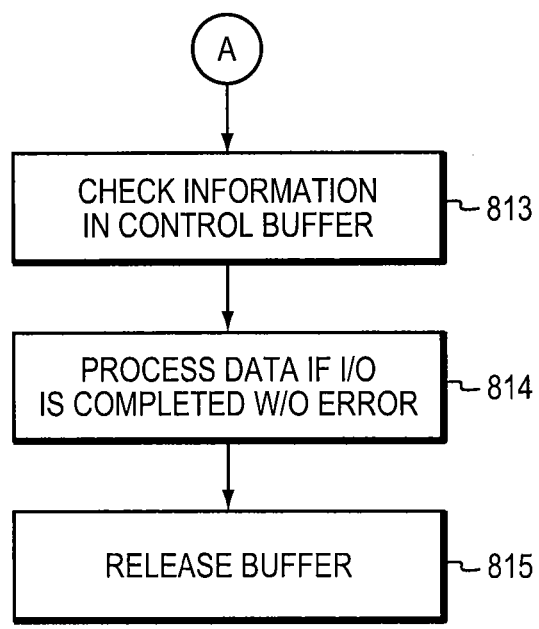

FIGS. 8a and 8b illustrates the exemplary steps in a Fibre Channel receive sequence offload performed by the accelerated CNA of FIG. 5. In this example, two separate I/O requests (i.e., I/O1 and I/O2) have been made by the SCSI stack (step 801). Once the requests are made, the Fibre Channel driver registers a SCSI buffer for each of the I/O tags corresponding to the I/O requests (step 802). In addition to the I/O tag, the SCSI buffer register request may also include a S/G list for data buffers, a control buffer, a receive size field, and the maximum number of receive frames allowed. In one embodiment, the I/O tag may be defined by a destination ID (D_ID), a source ID (S_ID), and an originator exchange ID (OX_ID). The D_ID identifies the destination device of the I/O. The S_ID identifies the source device of the I/O. The OX_ID identifies the particular I/O request between the source device and the destination device. The control buffer can be used to store information that includes the Fibre Channel header, SOF and EOF delimiters, and a timestamp indicating the arrival time of the frame at the CNA for each frame. The control buffer mechanism eliminates the need for CNA hardware to implement complex error detection and recovery protocols. The information in the control buffer for every frame of the I/O may be later examined by the Fibre Channel driver to verify whether an I/O has successfully completed. In particular, the verification process would make sure that the received frames conform to the Fibre Channel protocol and that all frames are received within a predefined time period. The receive size field specifies the total size of the I/O request. The maximum number of received frames field indicates the total number of frames expected to be received to complete the I/O.

One of the differences between this receiving process by the accelerated CNA and the one described above by the conventional CNA is that no buffer queue is required as long as there are SCSI buffers registered for each I/O. Once the SCSI buffers are registered, the Fibre Channel driver keeps track of which buffer is reserved for which I/O. As frames are received by the Ethernet NIC (step 803), the Ethernet NIC first checks the R_CTL field of each frame to see if the frame is a data frame (step 804). If the frame is a non-data frame, the Ethernet NIC uses its normal interface to send it to the standard L2 NIC driver to be further processed (step 805). If the frame is a data frame, the firmware in the Ethernet NIC checks whether the frame is a FCoE frame or a non-FCoE frame (e.g., TCP/IP frames) (step 806). If the frame is a non-FCoE frame, the Ethernet NIC put it in the general buffer where it can be accessed by the standard L2 NIC driver (step 807). The L2 NIC driver can then send the non-FCoE frames to the TCP/IP stack for further processing (step 808).

In contrast, if the frame is a FCoE frame, the Fibre Channel Receive Sequence Offload Module in the Ethernet NIC examines the Fiber Channel header of the frame to see which I/O the frame is a part of (step 809). Specifically, the Fibre Channel Receive Sequence Offload Module looks up the D_ID, S_ID, and OX_ID fields in the received frame to establish the frame's I/O tag. If no I/O tag can be established, the frame is sent to the standard L2 NIC driver. If an I/O tag can be determined, which means that the frame is a part of one of the registered I/Os (i.e., I/O1 or I/O2 in this example), the Fibre Channel Receive Sequence Offload Module will place the frame into the next empty space in the SCSI buffer registered for that particular I/O (step 810). In addition, the control information of the frame, such as the Fibre Channel header, the SOF and EOF delimiters, and the Timestamp are placed sequentially in the control buffer registered for the I/O tag (step 811). The timestamp resolution does not have to be synchronized with the drivers/OS.

It is worth noting again that, in this embodiment, there is no buffer queue to store the incoming frames temporarily before the frames are copied to the proper upper layer SCSI buffers. Because the built-in logic in the Fibre Channel Receive Sequence Offload Module is adapted to determine the I/O type of the frames, the frames can be put directly into the proper SCSI buffer, thereby eliminating the step of copying the frame from the buffer queue to the SCSI buffer. This can result in significant savings of CPU cycles required to carry out the I/O.

If all frames for a particular I/O have been received and put in the designated SCSI buffer, a status frame will be received by the Fiber Channel Receive Sequence Offload Module (step 812). The status frame indicates that the transmission of frames for this I/O has completed and that the corresponding SCSI buffer is not expected to receive more frames.

In addition, when the frames are being added to their assigned SCSI buffer, the information in their respective Fibre Channel header are extracted and stored in the control buffer. When an I/O is complete (i.e., all frames for the I/O has been received and put in the receiving buffer), the Fibre Channel driver checks the information in the control buffer for any error in the I/O (step 813). If an error is detected, the Fibre Channel driver may inform the SCSI stack that the I/O has failed and the SCSI stack does not have to process the actual data frames in the receiving buffer. Otherwise, the Fibre Channel driver may confirm the completion of the I/O to the SCSI stack and the SCSI stack can proceed to use the data in the buffer (step 814).

Subsequently, after the frames are processed by the program that requested the I/O, the SCSI buffer can be released for future I/O requests (step 815). In one embodiment, the Fibre Channel Receive Sequence Offload Module may include additional logic to make sure that the frames in the I/O are sorted in the right order.

Because the disclosed CNA presents multiple PCIe functions, one each for FCoE and non-FCoE traffic, the OS of the hosting device can instantiate separate drivers for handling these functions and allocate separate sets of resources which are exclusive to the given function. That is, the CNA can isolate the received FCoE and non-FCoE traffic based on protocol information in the frame and direct the frames to OS via appropriate function.

Figure 9:
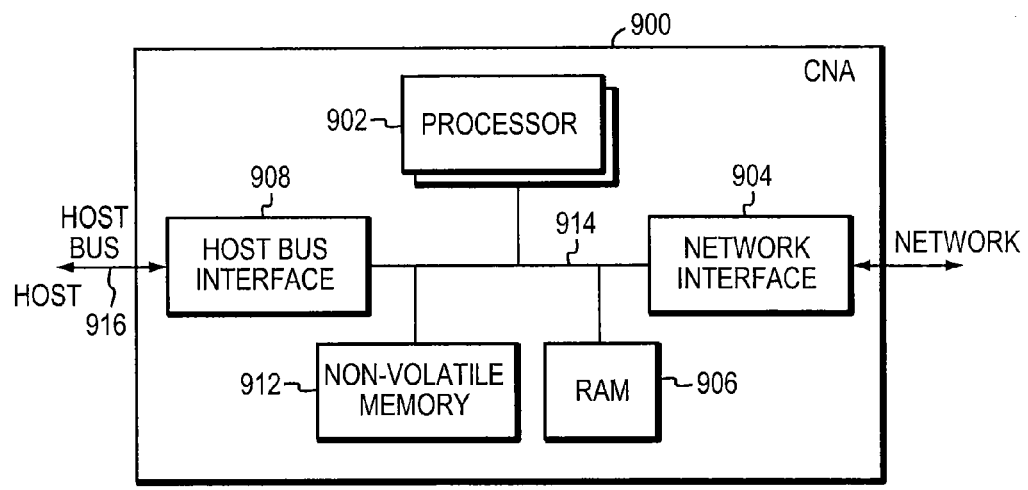
FIG. 9 illustrates a block diagram of an exemplary CNA according to embodiments of the present invention.

FIG. 9 illustrates another embodiment of the CNA that may include the sequence offload technology discussed above. As illustrated, the CNA 900 includes one or more processors 902, a network interface 904, a host bus interface 908, and computer readable storage media, such as Random Access Memory (RAM) 906 and non-volatile memory 912. The various components of the CNA 900 are all connected to a bus 914 in the CNA 900 and adapted to communicate with each other using the bus 914. The RAM 912 and the non-volatile memory 906 may be used to store firmware of the CNA 900 and other data. In other embodiments, the firmware may be stored on an external computer-readable storage medium such as a disk and loaded into the CNA 900 during operation. The host bus interface 908 connects the CNA 700 to its host via a host bus 910. The network interface 904 provides a gateway to an external network.

Figure 10:
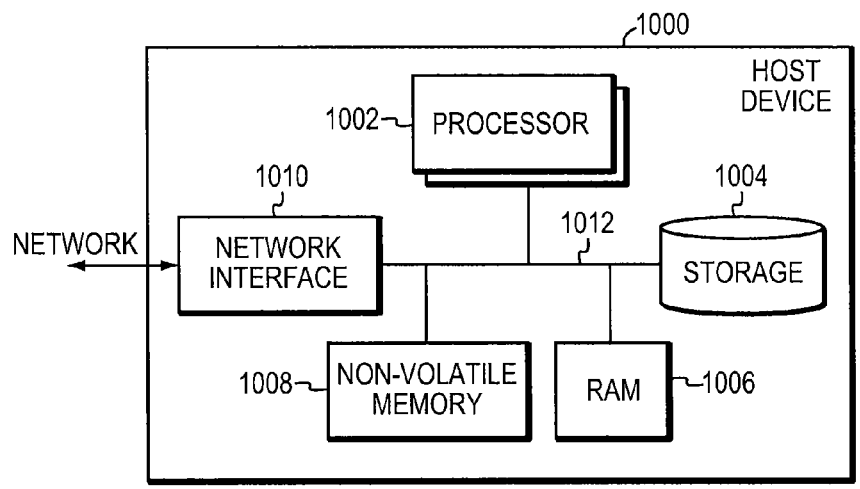
FIG. 10 illustrates a block diagram of an exemplary host device according to embodiments of the present invention.

FIG. 10 illustrates an exemplary host device according to an embodiment of the invention. The host device 1000 includes one or more processors 1002, a storage device 1004, a network interface 1010, RAM 1006, and non-volatile memory 1008. The host device 1000 may also include one or more device drivers and an CNA (not shown) as described above in view of FIG. 5. The processor 1002 may execute instructions stored in the RAM 1006 and the non-volatile memory 1008. The storage device 1004 may be a disk capable of storing programs such as firmware for the CNA. The host device is adapted to transmit and receive data from the network using the network interface 1010.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A network interface device for performing transmit sequence offloading in a Fibre Channel over Ethernet (FCoE) operation, the network interface comprising:
an FCoE encapsulation module that receives a single request for one or more data sequences, the FCoE encapsulation module being operable to encapsulate the one or more data sequences to generate a plurality of FCoE frames;
a Fibre Channel sequence offload interface operable to generate a single transmit request descriptor for transmitting the plurality of FCoE frames associated with the one or more data sequences, wherein the transmit sequence request descriptor comprises a sequence size of the one or more data sequences; and
a Fibre Channel transmit sequence offload module operable to separate the one or more data sequences into a plurality of data frames and operable to modify each of the plurality of data frames in response to information in the transmit sequence request descriptor, the Fibre Channel transmit sequence offload module in communication with the Fibre Channel sequence offload interface.

2. The network interface device of claim 1, wherein the network interface device comprises an Ethernet Network Interface Card (NIC) operable to transmit and receive FCoE communication, the Ethernet NIC in communication with the Fibre Channel transmit sequence offload module.

3. The network interface device of claim 2, wherein the Ethernet NIC comprises the Fibre Channel transmit sequence offload module.

4. The network interface device of claim 1, wherein the network interface device comprises a converged network adapter (CNA) operable to transmit and receive both FCoE and non-FCoE communications.

5. The network interface device of claim 1, wherein the transmit sequence request descriptor comprises Ethernet header information.

6. The network interface device of claim 1, wherein the transmit sequence request descriptor comprises Fibre Channel header information.

7. The network interface device of claim 1, wherein the transmit sequence request descriptor comprises a frame size of each of the plurality of data frames.

8. The network interface device of claim 1, wherein the transmit sequence request descriptor comprises frame delimiter information.

9. A method for performing transmit sequence offloading in a Fibre Channel over Ethernet (FCoE) device, the method comprising:
receiving a single request for one or more data sequences;
separating the one or more data sequences into a plurality of data frames;
generating a plurality of FCoE frames by encapsulating the plurality of data frames;
generating a single transmit request descriptor for transmitting the plurality of FCoE frames associated with the one or more data sequences, wherein the transmit sequence request descriptor comprises a sequence size of the one or more data sequences; and modifying each of the plurality of FCoE frames according to information in the transmit sequence request descriptor.

10. The method of claim 9, wherein the transmit sequence request descriptor comprises Ethernet header information.

11. The method of claim 9, wherein the transmit sequence request descriptor comprises Fibre Channel header information.

12. The method of claim 9, wherein the transmit sequence request descriptor comprises a frame size of each of the plurality of data frames.

13. The method of claim 9, wherein the transmit sequence request descriptor comprises frame delimiter information.

14. A Network Interface Card (NIC) comprising:
a processing unit comprising an offload engine, the processing unit operable to:
receive a single request for one or more data sequences;
separate the one or more data sequences into a plurality of data frames;
generate a plurality of Fibre Channel over Ethernet (FCoE) frames by encapsulating the plurality of data frames;
generate a single transmit request descriptor for transmitting the plurality of FCoE frames associated with the at least one Fibre Channel sequence, wherein the transmit sequence request descriptor comprises a sequence size of the one or more data sequences; and
modify each of the plurality of FCoE frames according to information in the transmit sequence request descriptor.

15. The NIC of claim 14, wherein the transmit sequence request descriptor comprises Ethernet header information.

16. The NIC of claim 14, wherein the transmit sequence request descriptor comprises Fibre Channel header information.

17. The NIC of claim 14, wherein the transmit sequence request descriptor comprises a frame size of each of the plurality of data frames.

18. The NIC of claim 14, wherein the transmit sequence request descriptor comprises frame delimiter information.

19. The NIC of claim 14, wherein the NIC comprises a Fibre Channel transmit sequence offload module.

20. The NIC of claim 14, wherein the NIC comprises a converged network adapter (CNA) operable to transmit and receive both FCoE and non-FCoE communications.

* * * * *